(12) United States Patent
Galy et al.

(10) Patent No.: US 8,019,337 B2
(45) Date of Patent: Sep. 13, 2011

(54) AIRCRAFT DATA TRANSMISSION SYSTEM FOR TRANSMITTING DATA BETWEEN AN AIRCRAFT AND A TRANSMISSION STATION LOCATED OUTSIDE THEREOF

(75) Inventors: Laurent Galy, Saint Paul sur Save (FR); Dominique Baron, Colomiers (FR)

(73) Assignee: Airbus France, Toulouse (FR)

( * ) Notice: Subject to any disclaimer, the term of this patent is extended or adjusted under 35 U.S.C. 154(b) by 798 days.

(21) Appl. No.: 11/996,335

(22) PCT Filed: Jul. 17, 2006

(86) PCT No.: PCT/FR2006/001739
§ 371 (c)(1),
(2), (4) Date: Jan. 21, 2008

(87) PCT Pub. No.: WO2007/012727
PCT Pub. Date: Feb. 1, 2007

(65) Prior Publication Data
US 2008/0214188 A1    Sep. 4, 2008

(30) Foreign Application Priority Data
Jul. 27, 2005  (FR) ..................................... 05 08008

(51) Int. Cl.
*H04W 4/00* (2009.01)
(52) U.S. Cl. .................. 455/431; 455/552.1; 455/552.2
(58) Field of Classification Search .................. 455/431, 455/552.1, 552.2
See application file for complete search history.

(56) References Cited

U.S. PATENT DOCUMENTS
6,181,990 B1 * 1/2001 Grabowsky et al. ............ 701/14
2005/0181787 A1 * 8/2005 Judd et al. ..................... 455/431

FOREIGN PATENT DOCUMENTS
WO    2004/045106    5/2004

OTHER PUBLICATIONS

International Search Report dated Mar. 1, 2007.
Written Opinion of the ISA dated Mar. 1, 2007 w/ English translation.
"Information Technology-ASN.1 encoding rules: Specification of Packed Encoding Rules (PER)," ITU-T Recommendation X.691, Jul., 2002, pp. i-v, 1-46 and 1 page list of ITU-T Recommendations.
W. Stallings, "Data and Computer Communications, 4th Edition," MacMillan Publishing Co., 1994, pp. 636-672.

* cited by examiner

*Primary Examiner* — Kamran Afshar
*Assistant Examiner* — Sayed T Zewari
(74) *Attorney, Agent, or Firm* — Dickinson Wright PLLC

(57) ABSTRACT

The invention relates to an aircraft data transmission system for transmitting data between the aircraft and a transmission station located outside thereof. The inventive system includes a transmitting/receiving device for transmitting and receiving data messaged from the outside of the aircraft, a message managing device comprising a device for carrying out the PER encoding/decoding of said messages, an interface device for displaying the incoming messages to an operator and enabling said operator to generate outgoing messages, an encoding device carrying out a function of encoding the encoding/decoding device and a recording device for recording all incoming and outgoing data messages related to an internal/external communication, which passes through the message processing device and is encoded, on a recording medium.

6 Claims, 2 Drawing Sheets

US 8,019,337 B2

AIRCRAFT DATA TRANSMISSION SYSTEM FOR TRANSMITTING DATA BETWEEN AN AIRCRAFT AND A TRANSMISSION STATION LOCATED OUTSIDE THEREOF

TECHNICAL FIELD OF THE INVENTION

The present invention relates to a data transmission system which is installed on an aircraft, in particular a transport aircraft, and which is intended for the transmission of data between the aircraft and at least one transmission station located outside of said aircraft during an internal/external communication.

BACKGROUND OF THE INVENTION

Although not exclusively, said transmission station is preferably located on the ground such that said internal/external communication represents a normal data communication of the ground/air type between the crew of the aircraft and a station located on the ground and is intended, in particular, for air control. The data transmitted during such a ground/air communication is generally encoded and standardized for reasons of optimizing the transmission performance and of interoperability between the crew of the aircraft and the station located on the ground.

It is furthermore known that such a data transmission system generally comprises:
 a transmitting/receiving device which is able to transmit outgoing data messages to outside of the aircraft and to receive incoming data messages from outside of the aircraft, said incoming and outgoing messages which pass through said transmitting/receiving device being encoded;
 a message management device:
  which is connected to said transmitting/receiving device;
  which receives said encoded incoming messages from said transmitting/receiving device and which transmits said encoded outgoing messages to said transmitting/receiving device; and
  which comprises an encoding/decoding means able to carry out encoding/decoding, for example of the PER type described below, said encoding/decoding means decoding said encoded incoming messages, in order to form decoded incoming messages, and encoding decoded outgoing messages in order to form said encoded outgoing messages; and
 at least one man/machine interface means:
  a which is connected to said message management device;
  which is able to present to an operator the decoded incoming messages, which are output from said message management device and which originate from said transmission station located outside of said aircraft; and
  which allows an operator to generate messages representing decoded outgoing messages, which are then transmitted to said message management device and which are to be sent to said transmission station located outside of said aircraft.

Because of an increasingly high number of data communications between the ground and aircraft, in particular transport aircraft, the certification authorities (EASA) have imposed [by means of a certification directive ("Certification Review Item: CRI-F26 Issue 03", dated 30 Jun. 2003) based on the standardized document ED112 ("Minimum operational performance specification for crash protected airborne recorder systems", March 2003 issue) and a document ED93 ("Minimum aviation system performance specification for CNS/ATM message recording systems", November 1998)] the recording, in the cockpit voice recorder, of all of the data exchanges between the crew and the ground. This data recording has been made obligatory for any aircraft whose type certification takes place after 1 Jan. 2005.

In order to meet this obligation, it is therefore appropriate to provide means, on board the aircraft, to record said ground/air or internal/external communications (with respect to the aircraft. However, such an arrangement has several disadvantages.

The addition of means is sometimes difficult to implement, and very often expensive and bulky. Moreover, such an addition makes the architecture of said data transmission system more complex.

Furthermore, as the cockpit voice recorder must record a minimum of two hours of communication and as the volume of data to be recorded is very variable depending on the communication between the controllers on the ground and the crew of the aircraft, the storage volume to be provided must be particularly high, which of course has a negative effect on cost and size.

SUMMARY OF THE INVENTION

The present invention relates to a data transmission system which makes it possible to overcome said disadvantages.

According to the invention, the data transmission system, which is installed on an aircraft and which is intended for the transmission of data between the aircraft and at least one transmission station located outside of said aircraft during an internal/external communication, in particular a ground/air communication, said data transmission system comprising:
 a transmitting/receiving device which is able to transmit outgoing data messages to outside of the aircraft and to receive incoming data messages from outside of the aircraft, said incoming and outgoing messages which pass through said transmitting/receiving device being encoded;
 a message management device:
  which is connected to said transmitting/receiving device;
  which receives said encoded incoming messages from said transmitting/receiving device and which transmits said encoded outgoing messages to said transmitting/receiving device; and
  which comprises an encoding/decoding means able to carry out an encoding/decoding, of the PER type, said encoding/decoding means decoding said encoded incoming messages, in order to form decoded incoming messages, and encoding decoded outgoing messages in order to form said encoded outgoing messages; and
 at least one man/machine interface means:
  which is connected to said message management device;
  which is able to present to an operator the decoded incoming messages, which are output from said message management device and which originate from said transmission station located outside of said aircraft; and
  which allows an operator to generate messages representing decoded outgoing messages, which are then transmitted to said message management device and which are to be sent to said transmission station located outside of said aircraft, is noteworthy in that:

said system furthermore comprises an encoding device which carries out an encoding of the PER type for any non-encoded data message which is relative to said internal/external communication, which passes through said message management device and which is intended to be recorded, for the purpose of carrying out a compression of these data messages;

said encoding device comprises at least one function of encoding of said encoding/decoding means which is integrated in said message management device; and said system furthermore comprises a recording device which is connected to said encoding device and which is foamed in such a way as to record, on at least one recording medium, any incoming or outgoing data message which is relative to said internal/external communication, which passes through said message management device and which is encoded according to an encoding of the PER type.

Thus, due to the invention, the data to be recorded are all previously compressed, being subjected to an encoding of the PER type, which corresponds to an encoding according to an international standard defined in the document "EUROCAE ED-100" ("Interoperability Requirements for ATS Applications using ARINC 622 Data Communications, final draft (RTCA DO-258), September 2000). Normally, an encoding corresponds to a conversion of data by means of a code, which allows their representation in a different form, and provides the possibility of returning to their original form by the intermediary of a corresponding decoding. However, in addition to encoding the data in this way, a PER encoding also carries out a compression of said data, that is to say a modification of these data in order to reduce their volume. Consequently, it is possible to provide a reduced storage volume for said recording medium which is intended for recording all the data (thus compressed) relative to internal/external communication. In particular, this makes it possible to reduce the cost and the size of said recording medium.

Moreover, according to the invention, as said encoding device carries out the encoding function of the encoding/decoding means existing in the data transmission system (for the normal encoding/decoding of incoming and outgoing messages), it is not necessary to provide a specific encoding device (more precisely a specific compression device).

Moreover, as said encoding device is thus integrated directly in the message management device, through which all the messages to he recorded pass, it is not necessary to provide a special means for receiving these messages to be recorded. The latter are in effect directly assessable, in said message management device, to the recording device which is connected to said encoding device.

Consequently, the said features according to the invention have a reduced cost and a reduced size and do not complicate the architecture of the data transmission system.

In a first embodiment, said encoding device generates (and transmits to said recording device) a frame comprising a frame of the PER type comprising at least one data message, together with additional information such as, for example, the time.

Moreover, in a second embodiment, said encoding device generates (and transmits to said recording device) a frame containing all of the data to be recorded. This implementation makes use of the definition of a more complete syntax that is used in the context of internal/external communication, preferably the ground/air exchanges. This frame is still transmitted by the message processing function.

The present invention also relates to a communication assembly comprising at least:

a data transmission system which is installed on an aircraft; and a data transmission station which is located outside of the aircraft, in particular an air control station located on the ground.

According to the invention, said data transmission system of said communication assembly is of the type of the aforesaid one.

BRIEF DESCRIPTION OF THE DRAWINGS

The figures of the appended drawing will give a good understanding of how the invention can be embodied. In these figures, identical references indicate similar items.

DETAILED DESCRIPTION OF THE INVENTION

Figure 1:
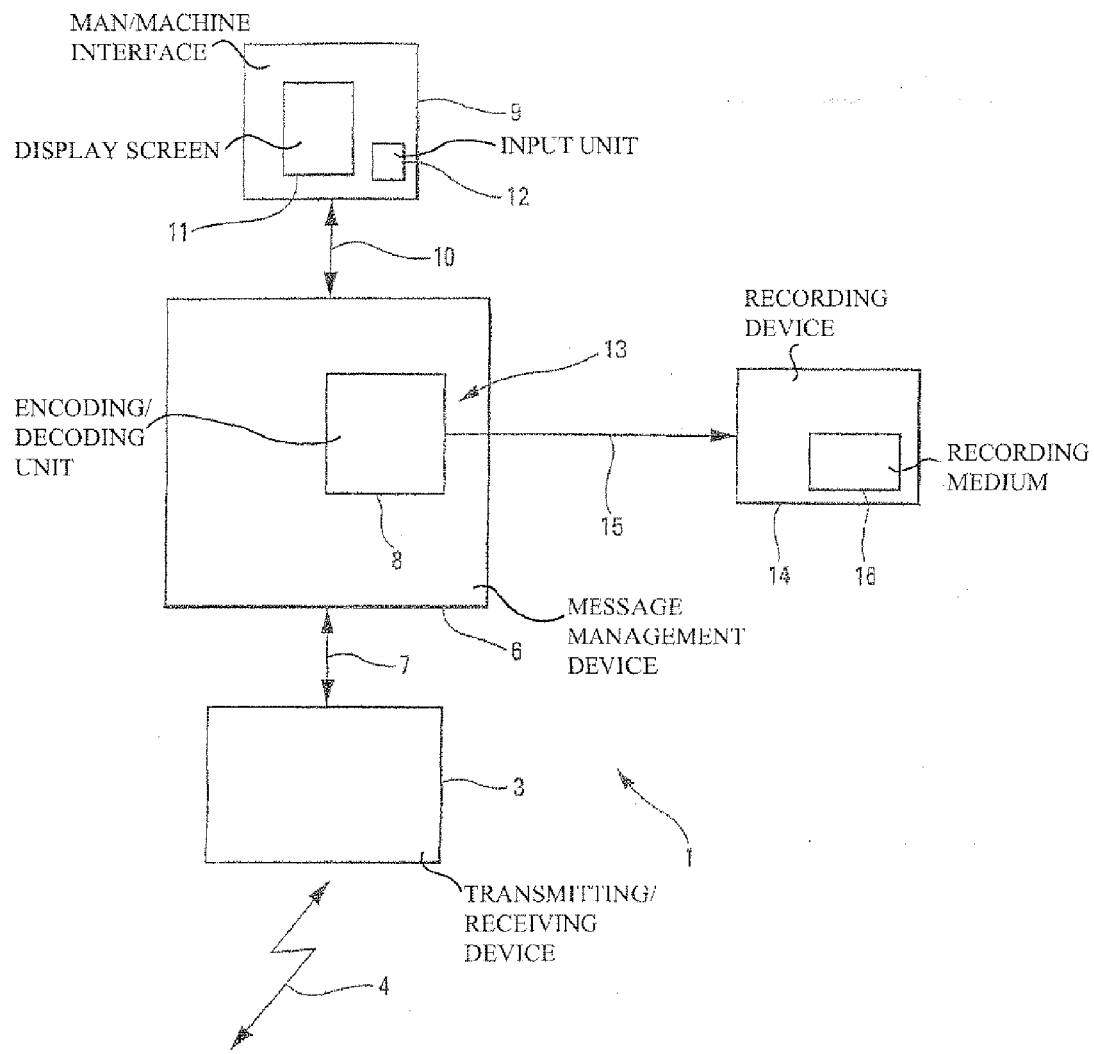
FIG. 1 is the block diagram of a data transmission system according to the invention.
Figure 2:
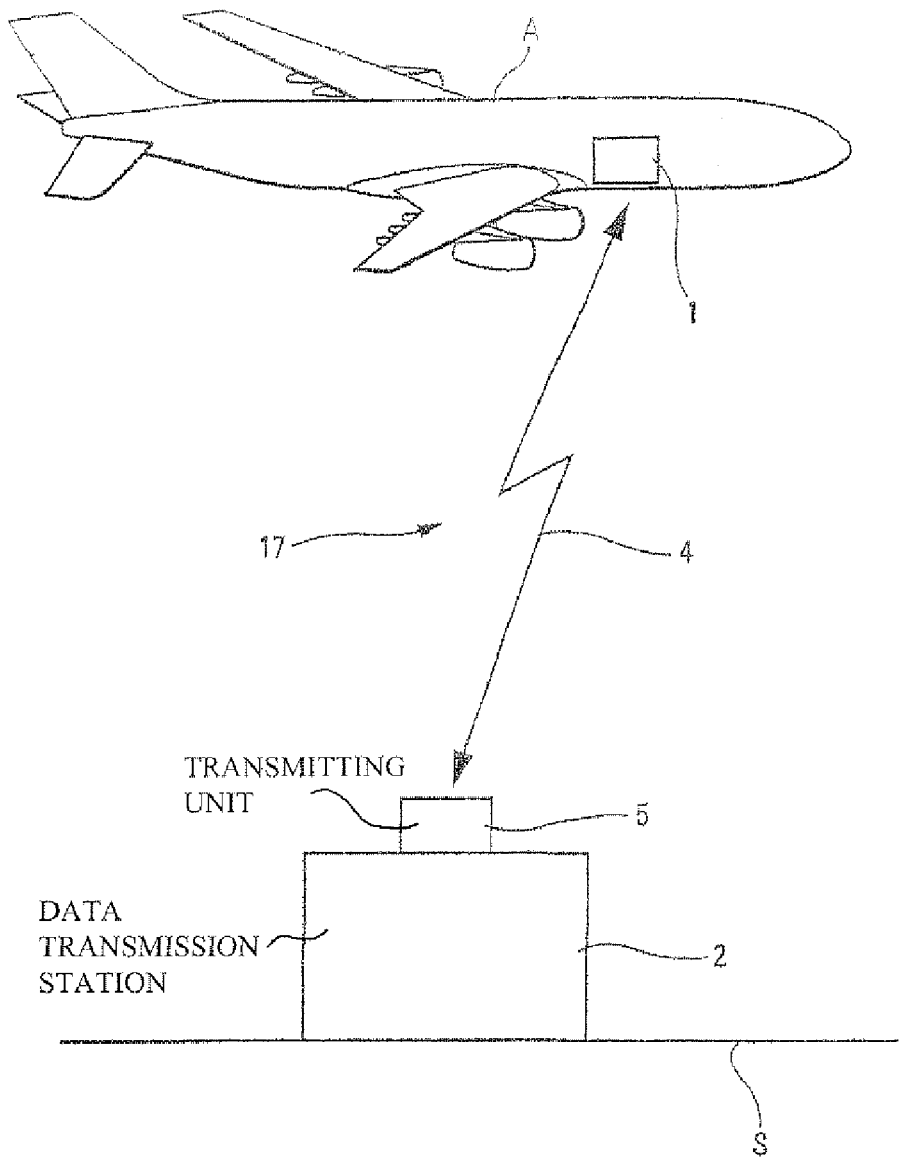
FIG. 2 is a diagrammatic illustration of a communication assembly according to the invention and comprising a data transmission system.

The data transmission system 1 according to the invention and shown diagrammatically in FIG. 1 is installed on an aircraft A, in particular an airplane, and is intended for the transmission of data between the aircraft A and at least one data transmission station 2 located outside of said aircraft A. This data transmission is carried out during a so-called "internal/external" communication in the context of the present invention, that is to say between the interior and the exterior of the aircraft A. Although not exclusively, said internal/external communication is preferably a communication of the usual ground/air type, between the crew of the aircraft A and a station 2 located on the ground S and intended in particular for air control, as shown in FIG. 2. However, this internal/external communication can also be a communication between the crew of the aircraft A and the crew of another moving object (air, terrestrial or maritime), of another aircraft in particular.

Said data transmission system 1 is of the type comprising:

a transmitting/receiving device 3 which is able to transmit to outside of the aircraft A, for example by the intermediary of electromagnetic waves 4, outgoing data messages and to receive incoming data messages from outside of said aircraft A, also by the intermediary of electromagnetic waves 4 which are transmitted by an appropriate means 5 of said transmitting station 2. This transmitting/receiving device 3 can of course correspond to any known type of device allowing a transmission/reception of data between the aircraft A and an external transmitting station 2. Moreover, said incoming and outgoing data messages, which sass between the exterior and said transmitting/receiving device 3, are all encoded, as described below;

a message management device 6:

which is connected by the intermediary of a two way link 7 to said transmitting/receiving device 3;

which receives said encoded incoming messages from said transmitting/receiving device 3;

which transmits said encoded outgoing messages to said transmitting/receiving device 3; and which comprises an encoding/decoding means 8 able to carry out an encoding/decoding of the PER type. An encoding of the PER type represents a normal encoding according to an international standard which is described in the aforesaid document "EUROCAE ED-100". Said encoding/decoding means 8 comprises for this purpose, on the one hand, a decoding function which decodes the encoded incoming messages in order to form decoded incoming messages, and, on the other hand, an encoding which encodes the decoded outgoing messages in order to form said encoded outgoing messages; and at least one man/machine interface means 9:
  which is connected by the intermediary of a two-way link 10 to said message management device 6;
  which is able to present, for example on a display screen 11, to an operator of the aircraft A, in particular to a pilot, the decoded incoming messages, which are output from said message management device 6 and which originate from said transmission station 2 located outside of said aircraft A; and
  which allows an operator to generate messages, using an appropriate means 12, for example an alphanumeric keyboard or a computer mouse, representing decoded outgoing messages, which are then transmitted to said message management device 6 and which are to be sent to said transmission station 2 located outside of said aircraft A, for example on the ground S.

Consequently, an incoming message is transmitted, in an encoded manner, by the intermediary of the means 5 of the transmission station 2. This encoded incoming message is received by the transmitting/receiving device 3 and it is transmitted, by the intermediary of the link 7, to the message management device 6. The latter decodes this encoded incoming message, by the intermediary of the encoding/decoding means 8, in order to form a decoded incoming message which is then transmitted to the man/machine interface means 9 by the intermediary of the link 10. Said interface means 9 finally presents this decoded incoming message to the operator by the intermediary of the display screen 11.

Moreover, an outgoing message is generated by the operator, for example by the intermediary of the means 12 of said man/machine interface 9. Said interface means 9 transmits this outgoing message, not encoded, to the message management device 6, by the intermediary of the link 10. The latter encodes this outgoing message, by the intermediary of the encoding/decoding means 8, in order to form an encoded outgoing message which is transmitted by the intermediary of the link 7 to the transmitting/receiving device 3. Said transmitting/receiving device 3 can finally transmit this encoded outgoing message to said transmission station 2 located on the ground S, for example in the form of electromagnetic waves 4.

According to the invention, in order to be able no record all of the data relative to an internal/external communication:
  said system 1 furthermore comprises an encoding (or compression) device 13 which carries out a data compression, by performing an encoding of the PER type for any data message (non-encoded and therefore not compressed):
    which is relative to said internal/external communication;
    which passes through said message management device 6; and
    which is intended to be recorded as described below;
  said decoding device 13 comprises the encoding function of said encoding/decoding means 8 which, as described above, is directly integrated in said message management device 6; and
  said system 1 furthermore comprises a recording device 14 which is connected by the intermediary of a link 15 to said encoding device 13 and which is formed in such a way as to record, on at least one usual recording medium 16, any incoming or outgoing data message, which is relative to said internal/external communication, which passes through said message management device 6, and which is encoded according to an encoding of the PER type (and therefore compressed).

Thus, due to the use of an encoding of the PER type ("ISO-8825-2"), which represents, as described above, a usual encoding according to an international standard defined in said document "EUROCAE ED-100", the system 1 according to the invention reduces the volume of the data (relative to said internal/external communication) that has to be recorded, which makes it possible to considerably reduce the storage volume of said recording medium 16. In fact, an encoding of the PER type carries out, in addition to the actual encoding, a data compression which is sufficiently high to obtain such a result.

In a preferred embodiment, said recoding device 14 corresponds to a cockpit voice recorder (CVR) of the aircraft A.

Moreover, due to the invention, as said encoding (or compression) device 13 uses the encoding function of the encoding/decoding means 8 existing in the system 1 (for the encoding/decoding of incoming and outgoing messages, as described above), it is not necessary to provide a specific encoding device (more precisely a specific compression device) in order to reduce the volume of the data to be recorded.

Moreover, as said encoding device 13 is thus integrated directly in said message management device 6, through which all of the messages to be recorded pass, it is not necessary to provide a special means for receiving these messages to be recorded, which are therefore directly accessible in said message management device 6 for the purpose of recording them.

Consequently, the aforesaid features, according to the invention and making it possible to record all of the data relative to the internal/external communication, have a reduced cost and a reduced size. Moreover, these features do not make the architecture of said data transmission system 1 more complex.

In a first particular embodiment, said encoding device 13 generates (and transmits to said recording device 14) a frame comprising a frame of the PER type comprising at least one data message, together with additional information such as the time, the state of progress of the processing of the message and the transmitting ATC application. A frame usually represents the set of consecutive bits forming a block inside of which are zones for the transmission of a user's data and of service information.

Moreover, in a second particular embodiment, said encoding device 13 generates (and transmits to said recording device 14) a PER frame containing the totality of the information intended for the message recording device. This implementation makes use of the definition of a syntax more complex than that used in the context of the internal/external communication, preferably the ground/air exchanges. This frame is still transmitted by the message processing function.

As shown in FIG. 2, the data transmission system 1 according to the invention, which is installed on the aircraft A, is part of a communication assembly 17 which comprises, in addition to said system 1, at least one data transmission station which is located outside of the aircraft A, in particular an air control station 2 which is located on the ground.

The invention claimed is:
1. An aircraft data transmission system configured to transmit data between the aircraft and at least one transmission station located outside of said aircraft during an internal/external communication, said system comprising:
- a transmitting/receiving device configured to transmit outgoing data messages to outside of the aircraft and to receive incoming data messages from outside of the aircraft, said incoming and outgoing messages that pass through said transmitting/receiving device being encoded;
- a message management device connected to said transmitting/receiving device and configured to receive said encoded incoming messages from said transmitting/receiving device and to transmit said encoded outgoing messages to said transmitting/receiving device;
- wherein said message management device comprises an encoding/decoding unit configured to decode said encoded incoming messages, and to encode decoded outgoing messages, said encoding/decoding unit being further formed to carry out an encoding/decoding of a Packet Encoding Rule (PER) type;
- at least one man/machine interface unit connected to said message management device and configured to present to an operator the decoded incoming messages output from said message management device that originate from said transmission station located outside of said aircraft and configured to allow the operator to generate messages representing decoded outgoing messages, which are transmitted to said message management device and sent to said transmission station located outside of said aircraft;
- a compression device that carries out a compression for any data message which is not encoded, is relative to said internal/external communication, passes through said message management device, and is to be recorded, wherein said compression device comprises at least one encoding function of said encoding/decoding unit that is integrated in said message management device and carries out said compression in the form of an encoding of a Packet Encoding Rule (PER) type; and a recording device, said recording device being connected to said encoding/decoding unit and formed to record, on at least one recording medium, any incoming or outgoing data message, which is relative to said internal/external communication, which passes through said message management device and which is encoded according to an encoding of the Packet Encoding Rule (PER) type.

2. The system as claimed in claim 1, wherein said recording device is a cockpit voice recorder of the aircraft.

3. The system as claimed in claim 1, wherein said encoding device generates and transmits to said recording device a frame comprising a frame of the PER type comprising at least one data message, together with additional information.

4. The system as claimed in claim 1, wherein said encoding device generates and transmits to said recording device, a frame including the data to be recorded.

5. A communication assembly comprising:
- a data transmission system which is installed on an aircraft; and
- a data transmission station which is located outside of the aircraft,
- wherein said data transmission system is of the type claimed in claim 1.

6. An aircraft, comprising a data transmission system of the type claimed in claim 1.

* * * * *